US006796003B1

(12) United States Patent
Marvel

(10) Patent No.: US 6,796,003 B1
(45) Date of Patent: Sep. 28, 2004

(54) ROPE KNOT SYSTEM

(76) Inventor: David R. Marvel, 305 Harbor Dr., Indian Rocks Beach, FL (US) 33785

( * ) Notice: Subject to any disclaimer, the term of this patent is extended or adjusted under 35 U.S.C. 154(b) by 0 days.

(21) Appl. No.: 10/324,665

(22) Filed: Dec. 20, 2002

(51) Int. Cl.[7] ............................................. F16G 11/00
(52) U.S. Cl. .................. 24/135 N; 24/115 H; 24/136 B
(58) Field of Search ............................. 403/373, 374.1, 403/374.2, 396, 374.3, 398, 374.4; 24/135 R, 135 N, 115 R, 115 K, 115 H, 136 B; 439/778, 779, 792, 793, 811

(56) References Cited

U.S. PATENT DOCUMENTS

| | | | | |
|---|---|---|---|---|
| 1,659,312 A | * | 2/1928 | Colwell | 439/798 |
| 1,796,409 A | * | 3/1931 | Schuler | 403/396 |
| 1,958,196 A | * | 5/1934 | Lundy et al. | 439/811 |
| 2,102,896 A | * | 12/1937 | Heinrich | 439/779 |
| 2,482,901 A | * | 9/1949 | Cianfrone | 43/44.85 |
| 2,547,225 A | * | 4/1951 | Mebold | 403/396 |
| 2,935,088 A | * | 5/1960 | Thompson et al. | 137/613 |
| 3,552,257 A | * | 1/1971 | Tanabe | 411/368 |
| 3,923,406 A | * | 12/1975 | Iritz | 403/43 |
| 4,034,616 A | * | 7/1977 | Rauscher | 474/174 |
| 4,536,921 A | * | 8/1985 | Brendel et al. | 24/132 WL |
| 6,115,890 A | * | 9/2000 | Silagy | 24/135 R |

FOREIGN PATENT DOCUMENTS

JP         07238479 A  *  9/1995  ............ D07B/1/00

* cited by examiner

Primary Examiner—James R. Brittan
(74) Attorney, Agent, or Firm—Louis J. Brunoforte

(57) ABSTRACT

A rope knot system has a main body with a first end with a head, a second end with male threads and an intermediate cylindrical region with an exterior flat and arcuate sections to thereby form a male slide surface. A slot through the intermediate region receives a rope. A slide member has an exterior surface and an interior surface with an interior flat and arcuate sections positionable in sliding contact with the intermediate region. A nut is formed with threads rotatably coupled to the threads of the main body portion and with an end face positionable in contact with the slide member.

4 Claims, 2 Drawing Sheets

ROPE KNOT SYSTEM

BACKGROUND OF THE INVENTION

1. Field of the Invention

The present invention relates to a rope knot system and more particularly pertains to allowing a user to safely and conveniently form and lock a rope loop.

2. Description of the Prior Art

The use of rope securement devices of known designs and configurations is known in the prior art. More specifically, rope securement devices of known designs and configurations previously devised and utilized for the purpose of handling ropes through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,359,632 issued Oct. 3, 1944, to C. E. Eales is entitled clamping device. U.S. Pat. No. 702,214 issued Jun. 10, 1902 to Hull discloses a rope clasp. U.S. Pat. No. 1,206,044 issued Nov. 8, 1916, is entitled rope clamp. U.S. Pat. No. 2,162,561 issued Jun. 13, 1939, is entitled connector. U.S. Pat. No. 6,038,746 issued Mar. 21, 2000, to Anscher et al. is entitled pre-loadable cord lock. U.S. Pat. No. 1,993,391 issued Mar. 5, 1935, to Weaver is entitled unitary wire connecter. U.S. Pat. No. 2,088,414 issued Jul. 27, 1937, to Heinrich is entitled electrical connecter. U.S. Pat. No. 2,027,415 issued Jan. 14, 1936, is entitled unitary wire connecter. U.S. Pat. No. 3,028,671 issued Apr. 10, 1962, is entitled orthodontia appliances. U.S. Pat. No. 3,210,818 issued Oct. 12, 1965, is entitled clamps. U.S. Pat. No. 4,178,687 issued Dec. 18, 1979, is entitled clamp, particularly for orthodontia. U.S. Pat. No. Des. 221,758 issued Sep. 7, 1971, is entitled a valve receiving tubing clamp. Lastly, U.S. Pat. No. Des. 372,857 issued Aug. 10, 1996, is entitled bolt and nut assembly.

While these devices fulfill their respective, particular objectives and requirements, the aforementioned patents do not describe a rope knot system that allows allowing a user to safely and conveniently form and lock a rope loop.

In this respect, the rope knot system according to the present invention substantially departs from the conventional concepts and designs of the prior art, and in doing so provides an apparatus primarily developed for the purpose of allowing a user to safely and conveniently form and lock a rope loop.

Therefore, it can be appreciated that there exists a continuing need for a new and improved rope knot system which can be used for allowing a user to safely and conveniently form and lock a rope loop. In this regard, the present invention substantially fulfills this need.

SUMMARY OF THE INVENTION

In view of the foregoing disadvantages inherent in the known types of rope securement devices of known designs and configurations now present in the prior art, the present invention provides an improved rope knot system. As such, the general purpose of the present invention, which will be described subsequently in greater detail, is to provide a new and improved rope knot system and method which has all the advantages of the prior art and none of the disadvantages.

To attain this, the present invention essentially comprises a length of rope. The rope has a first end, a central extent, and a second end.

Next provided is a plastic receiving main body portion. The main body portion has a first end with an enlarged head in a cylindrical configuration with an octagonal cross section. The main body portion also has a second end of a reduced diameter with male threads formed therein. The main body portion also has an intermediate cylindrical region there between having a cross section formed of two parallel flats and arcuate sections between flats to thereby form a male slide surface. A slot through the intermediate cylindrical region extends between the flat sections for the receipt of the rope with the central extent in a loop on one side and the free ends on the other side. The slot has a V-shaped projection adjacent to the head for gripping the rope.

A plastic slide member is next provided. The slide member has a cylindrical exterior surface with a circular cross section. The slide member also has a cylindrical interior surface with a cross section. The interior surface has two parallel interior flats positionable in sliding contact with the exterior flats. Two interior arcuate sections between the flats are positionable in sliding contact with the exterior arcuate sections. The slide also has a V-shaped groove positionable in proximity to the head of the main body portion to hold the rope in the slot.

Next provided is a plastic nut. The nut is formed with interior female threads rotatably coupled to the threads of the main body portion. The nut has an exterior surface in a fluted configuration. The exterior surface of the nut has an end face positionable in contact with the slide member to move the slide member toward and away from the head end with the rotation of the nut. In this manner, the rope is locked within the slot of the main body portion, Finally, a stainless steel snap ring is provided. The snap ring has an annular recess adjacent to the end of the main body portion. The snap ring precludes removal of the nut from the main body portions during operation and use.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rope knot system which has all of the advantages of the prior art rope securement devices of known designs and configurations and none of the disadvantages.

It is another object of the present invention to provide a new and improved rope knot system which may be easily and efficiently manufactured and marketed.

It is further an object of the present invention to provide a new and improved rope knot system which is of durable and reliable constructions.

An even further object of the present invention is to provide a new and improved rope knot system which is susceptible of a low cost of manufacture with regard to both materials and labor, and which accordingly is then susceptible of low prices of sale to the consuming public, thereby making such rope knot system economically available to the buying public.

Even still another object of the present invention is to provide a rope knot system for allowing a user to safely and conveniently form and lock a rope loop.

Lastly, it is an object of the present invention to provide a new and improved rope knot system having a main body with a first end with a head, a second end with male threads and an intermediate cylindrical region with an exterior flat and arcuate sections to thereby form a male slide surface. A slot through the intermediate region receives a rope. A slide member has an exterior surface and an interior surface with an interior flat and arcuate sections positionable in sliding contact with the intermediate region. A nut is formed with threads rotatably coupled to the threads of the main body portion and with an end face positionable in contact with the slide member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
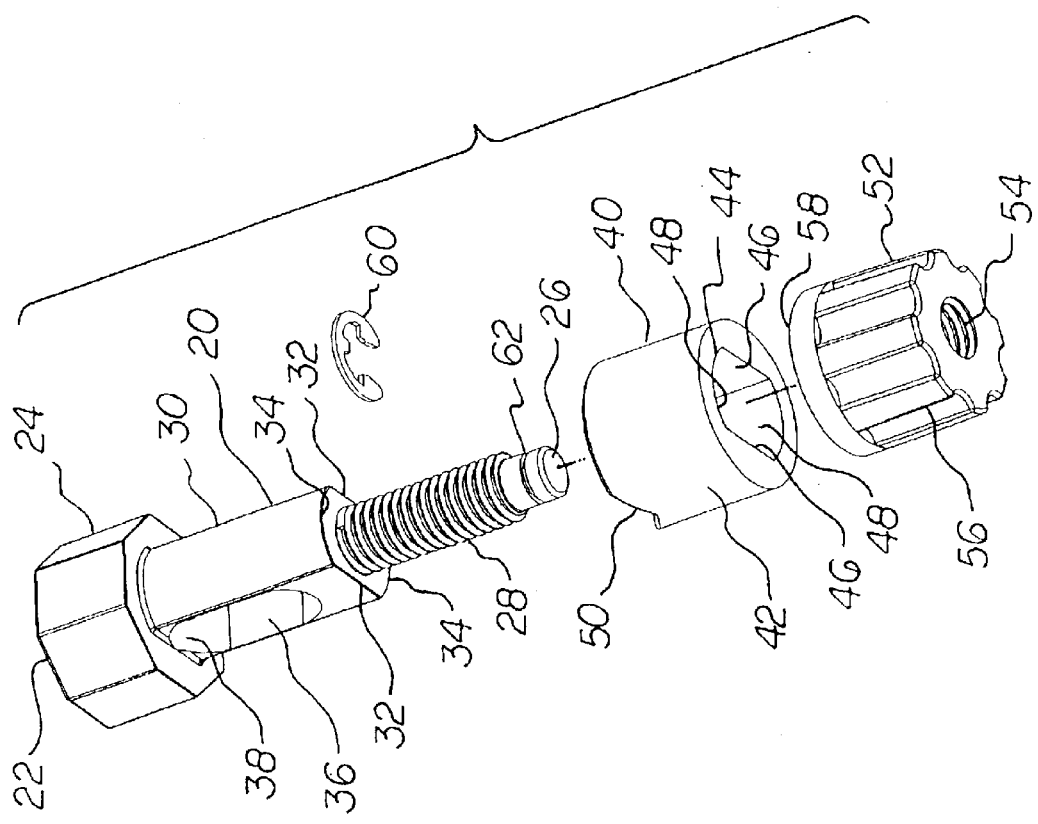
FIG. 1 is an exploded perspective view of the rope knot system constructed in accordance with the principles of the present invention.
Figure 2:
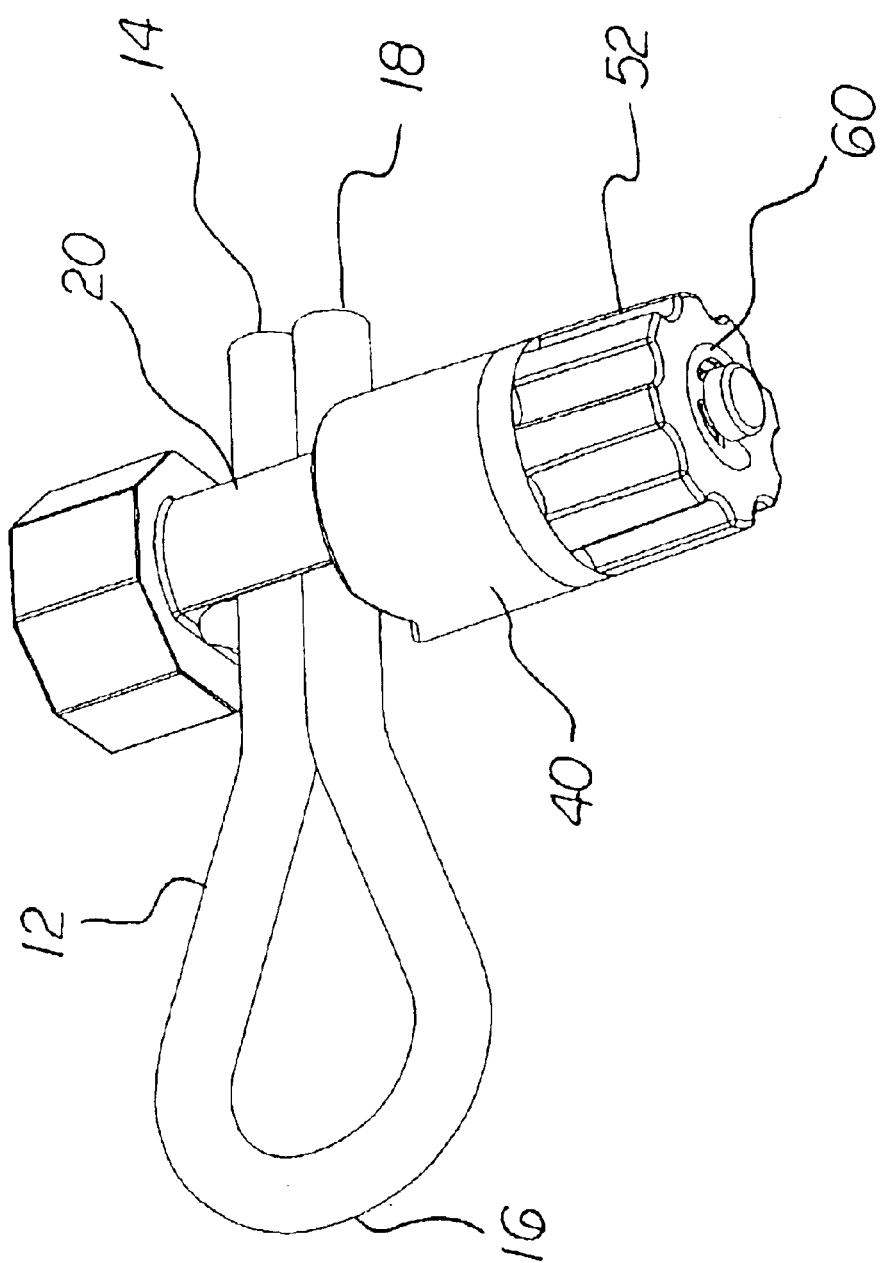
FIG. 2 is a perspective view of the system of FIG. 1 during operation and use while securing a rope.

With reference now to the drawings, and in particular to FIG. 1 thereof, the preferred embodiment of the new and improved rope knot system embodying the principles and concepts of the present invention and generally designated by the reference numeral 10 will be described.

The present invention, the rope knot system 10 is comprised of a plurality of components. Such components in their broadest context include a main body portion, a slide member, and a nut. Such components are individually configured and correlated with respect to each other so as to attain the desired objective.

First provided is a length of rope 12. The rope has a first end 14, a central extent 16, and a second end 18.

Next provided is a plastic receiving main body portion 20. The main body portion has a first end 22 with an enlarged head 24 in a cylindrical configuration with an octagonal cross section. The main body portion also has a second end 26 of a reduced diameter with male threads 28 formed therein. The main body portion also has an intermediate cylindrical region 30 there between having a cross section formed of two parallel flats 32 and arcuate sections 34 between flats to thereby form a male slide surface. A slot 36 through the intermediate cylindrical region extends between the flat sections for the receipt of the rope with the central extent in a loop on one side and the free ends on the other side. The slot has a V-shaped projection 38 adjacent to the head for gripping the rope.

A plastic slide member 40 is next provided. The slide member has a cylindrical exterior surface 42 with a circular cross section. The slide member also has a cylindrical interior surface 44 with a cross section. The interior surface has two parallel interior flats 46 positionable in sliding contact with the exterior flats. Two interior arcuate sections 48 between the flats are positionable in sliding contact with the exterior arcuate sections. The slide also has a V-shaped groove 50 positionable in proximity to the head of the main body portion to hold the rope in the slot.

Next provided is a plastic nut 52. The nut is formed with interior female threads 54 rotatably coupled to the threads of the main body portion. The nut has an exterior surface 56 in a fluted configuration. The exterior surface of the nut has an end face 58 positionable in contact with the slide member to move the slide member toward and away from the head end with the rotation of the nut. In this manner, the rope is locked within the slot of the main body portion.

Finally, a stainless steel snap ring 60 is provided. The snap ring has an annular recess 62 adjacent to the end of the main body portion. The snap ring precludes removal of the nut from the main body portions during operation and use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A rope knot system for allowing a user to safely and conveniently form and lock a rope loop comprising in, combination:

a length of rope having a first end and a second end and central extent there between;

a plastic receiving main body portion having a first end with an enlarged head in a cylindrical configuration with an octagonal cross section, a second end of a reduced diameter with male threads formed therein terminating in a free end remote from the head and an intermediate cylindrical region there between having a cross section formed of two parallel flats and arcuate sections between flats to thereby form a male slide surface, the intermediate cylindrical region having a slot there through extending between the flat sections for the receipt of the rope with the central extent of in a loop on one side and the free ends on the other side, the slot having a V-shaped projection adjacent to the head for gripping the rope;

a plastic slide member having a cylindrical exterior surface with a circular cross section and a cylindrical interior surface with a cross section with two parallel interior flats positionable in sliding contact with the exterior flats and two interior arcuate sections between the flats positionable in sliding contact with the exterior arcuate sections, the slide also having a V-shape groove positionable in proximity to the head of the main body portion to hold the rope in the slot;

a plastic nut formed with interior female threads rotatably coupled to the threads of the main body portion and with an exterior surface in a fluted configuration with an end face positionable in contact with the slide member to move the slide member toward and away from the head end with the rotation of the nut to thereby lock the rope within the slot of the main body portion; and a stainless steel snap ring with an annular recess adjacent to the free end of the main body portion to preclude removing the nut from the main body portions during operation and use.

2. A rope knot system comprising:

a main body portion having a first end with an imperforate head, a second end with male threads terminating in a free end remote from the head and an intermediate cylindrical region having exterior flat section and arcuate sections to thereby form a male slide surface along its length, the intermediate region having an oval slot through the flat sections for the receipt of the rope;

a slide member having an exterior surface and an interior surface with interior flat sections and arcuate sections to form a female slide surface along its length positionable in sliding contact with the intermediate region; and a nut formed with threads rotatably coupled to the threads of the main body portion and with an end face positionable in contact with the slide member.

3. The system as set forth in claim 2 and further including a stainless steel snap ring with an annular recess adjacent to the free end of the main body portion to preclude removing the nut from the main body portion during operation and use.

4. The system as set forth in claim 2 wherein the main body portion, slide member and nut are fabricated of plastic.

* * * * *